United States Patent [19]

Huang et al.

[11] Patent Number: 5,058,200

[45] Date of Patent: Oct. 15, 1991

[54] TRANSMITTER LOCATION SEARCHING SYSTEM

[75] Inventors: Chia-Chi Huang, Yorktown Heights; Charles M. Puckette, Schenectady, both of N.Y.

[73] Assignee: General Electric Company, Schenectady, N.Y.

[21] Appl. No.: 533,264

[22] Filed: Jun. 4, 1990

[51] Int. Cl.$^5$ .......................... H04B 1/00; H04B 7/00
[52] U.S. Cl. ........................................ 455/33; 455/54; 455/56; 455/67
[58] Field of Search ....................... 455/33, 54, 56, 67; 340/988, 993; 342/450, 457, 463, 465; 364/449

[56] References Cited

U.S. PATENT DOCUMENTS

| | | | |
|---|---|---|---|
| 4,161,734 | 7/1979 | Anderson | 343/100 |
| 4,755,761 | 7/1988 | Ray | 329/50 |
| 4,799,062 | 1/1989 | Sanderford, Jr. et al. | 342/450 |
| 4,864,313 | 9/1989 | Konneker | 342/457 |
| 4,888,557 | 12/1989 | Puckette et al. | 329/341 |
| 4,902,979 | 2/1990 | Puckette | 329/343 |

OTHER PUBLICATIONS

G. Turin et al., "Simulation of Urban Vehicle-Monitoring Systems", IEEE Trans. on Vehicular Technology, vol. VT-21, No. 1, Feb. 1972, pp. 9–16.

Primary Examiner—Curtis Kuntz
Assistant Examiner—Chi H. Pham
Attorney, Agent, or Firm—Marvin Snyder; James C. Davis, Jr.

[57] ABSTRACT

A transmitter location searching system produces fast, stable and accurate results in a multipath transmission environment by geometrically partitioning the monitored area into a plurality of cells and finding the optima of a total cost function at the centers of the cells. The original three-dimensional optimization problem is thus reduced to a one-dimensional problem. Based on this calculation, the cell providing the smallest cost is chosen as a new candidate cell which is divided into smaller cells and the minimum costs are calculated for each of these smaller cells. The cell that provides the smallest cost is chosen as the center of another new candidate cell. The process is iterated until a dimension of a new candidate cell is smaller than a predetermined threshold. By reducing the dimensions of each cell by a factor of two at each iteration, the algorithm converges rapidly.

13 Claims, 8 Drawing Sheets

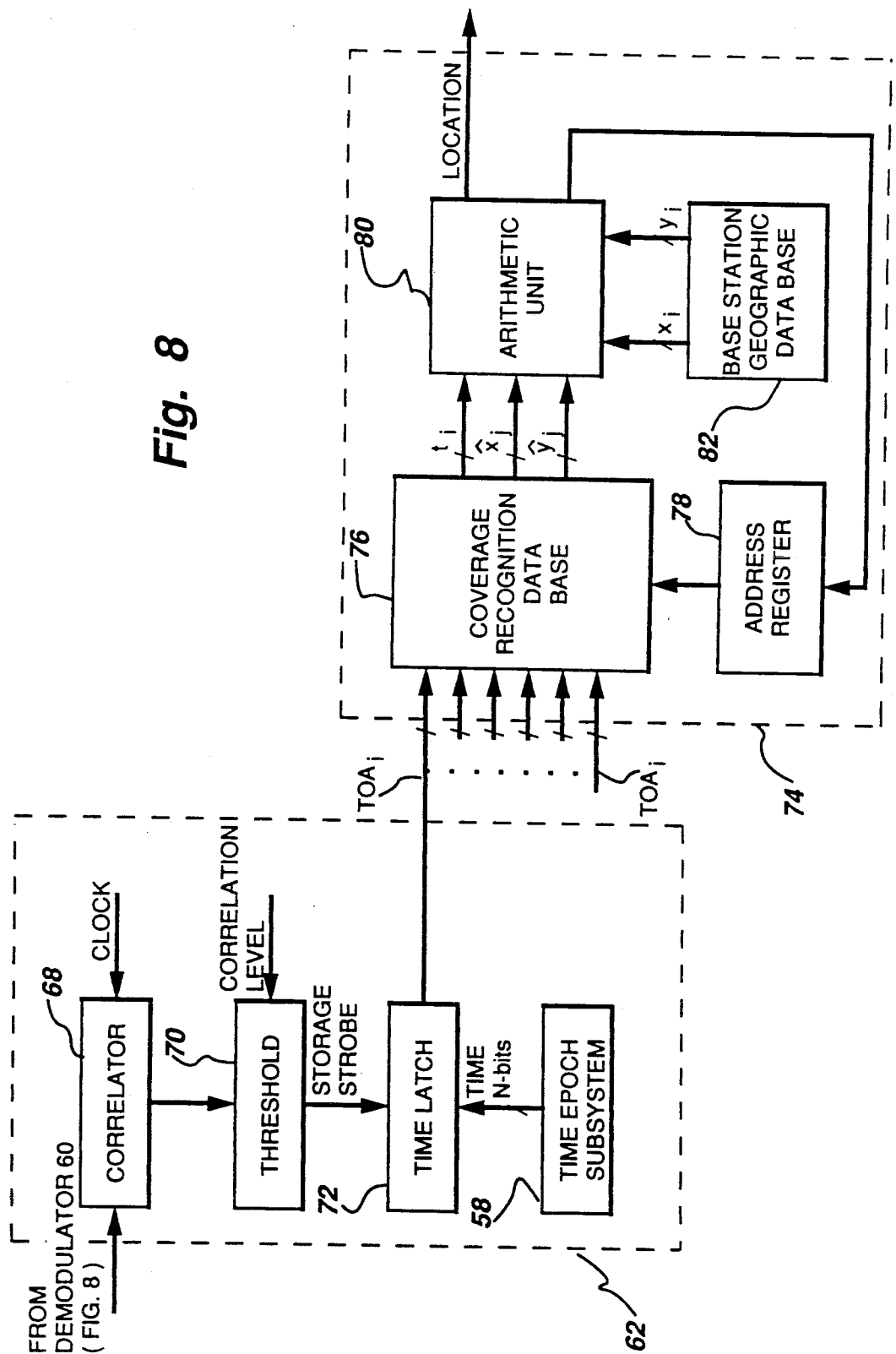

TRANSMITTER LOCATION SEARCHING SYSTEM

BACKGROUND OF THE INVENTION

1. Field of the Invention

The present invention generally relates to mobile transmitter position monitoring and locating systems and, more particularly, to a transmitter location searching system which uses a search algorithm based on geographical partition and local optimization.

2. Description of the Prior Art

There are many applications for mobile transmitter position monitoring and locating systems. For example, transmitters may be fitted to motor vehicles in an urban and/or suburban environment so that the positions of the vehicles may be monitored by one or more base stations. The vehicles may be governmental vehicles, such as police automobiles or fire and rescue trucks, or they may be commercial vehicles, such as delivery trucks or service vehicles. Alternatively, the transmitters may be mounted on ships or other mobile vessels to enable their positions to be monitored through use of satellites. The latter system, as described in R. E. Anderson U.S. Pat. No. 4,161,734, issued Jul. 17, 1979 and assigned to the instant assignee, employs an active ranging satellite and a satellite that transmits timing signals. One line of position is determined by two-way active ranging through the first satellite and the other line of position is determined by one-way ranging from the second satellite. The time interval between arrival of a timing signal and reception of the active ranging signal, measured at the ship, is sent to an earth station where the position fix is computed. The Anderson U.S. Pat. No. 4,161,734 is incorporated herein by reference.

A typical vehicle monitoring system includes, in addition to the transmitters fitted to the vehicles, a plurality of base stations distributed in the geographical area over which the monitoring takes place. A transmitter on a vehicle transmits, either periodically or in response to a polling signal, a short radio signal which is propagated in an urban and/or suburban multipath fading environment and received by each base station. Using signal arrival times measured at each base station, the location system must estimate the location of the mobile transmitter.

The transmitter location searching problem can be formulated as an optimization problem. An individual cost function for each base station is constructed as follows:

$$f_i(x,y,t) = c(t_i - t) - \sqrt{(x_i - x)^2 + (y_i - y)^2} \quad (1)$$

where the left-hand term is the individual cost function for the i'th base station, c is the speed of light, $t_i$ is the measured signal arrival time at the i'th base station, $x_i$ and $y_i$ are the known geographical coordinates of the i'th base station, t is the time when the radio signal is transmitted, and x and y are the geographical coordinates of the mobile transmitter to be located. As is well known in the art, the term "cost" employed herein refers to the error associated with each measurement. Intuitively, the individual cost function for each base station represents the difference between the radio propagation distance and the physical distance between the base station and the estimated transmitter location.

For the case shown in FIG. 1, a total cost function is constructed from the six individual cost functions by summing the weighted square of all the individual cost functions as follows:

$$F(x,y,t) = \sum_{i=1}^{6} w_i^2 f_i^2(x,y,t) \quad (2)$$

where $w_i$ is a weighting factor ($0 \pm w_i \pm 1$) which is associated with the signal strength measured at each base station. For a strong signal, $w_i$ is given a value close to one, and for a weak signal, it is given a value close to zero. The problem of finding the location of the transmitter is now transformed to the problem of finding the triple (x,y,t) which minimizes the total cost function; i.e., solve $$\underset{x,y,t}{\text{MINIMIZE}} \; F(x,y,t). \quad (3)$$

Because of the nonlinearity involved in equation (1), equation (3) is difficult to solve. In order to simplify the problem, George L. Turin, William S. Jewell and Tom L. Johnson ("Simulation of Urban Vehicle-Monitoring Systems", IEEE Transactions on Vehicular Technology, Vol. VT-21, No. 1, Feb. 1972, at pages 9 to 16, and incorporated herein by reference) linearized equation (1) by means of a first order Taylor series expansion around a candidate triplet $(x_0,y_0,t_0)$ before equation (1) is substituted into equation (2). The result is as follows:

$$\tilde{F}(x,y,t) \approx \sum_{i=1}^{6} w_i^2 [f_i(x_0,y_0,t_0) + \Delta_{xi}h + \Delta_{yi}k - cu]^2 \quad (4)$$

where some changes of variables have been made and $x_0,y_0,t_0$ is the initial guess of the vehicle's location. The relations between old and new variables are given in equations (5), (6) and (7) as follows:

$$h = x - x_0, \; k = y - y_0, \; u = t - t_0 \quad (5)$$

$$\Delta_{xi} = \frac{x_i - x_0}{\sqrt{(x_i - x_0)^2 + (y_i - y_0)^2}} \quad (6)$$

$$\Delta_{yi} = \frac{y_i - y_0}{\sqrt{(x_i - x_0)^2 + (y_i - y_0)^2}}. \quad (7)$$

Because equation (5) is linear, the point $(x_m,y_m,t_m)$ which produces a minimum in equation (4) is the simultaneous solution of the following three partial derivative equations:

$$\frac{\partial F}{\partial h} = 0, \; \frac{\partial F}{\partial k} = 0, \; \frac{\partial F}{\partial u} = 0. \quad (8)$$

These three equations in $\{h,k,u\}$ are linear, and can be solved by the well-known Gaussian elimination method.

After equation (8) is solved, the candidate point is modified according to the following equations:

$$x_0' = x_0 + h, \; y_0' = y_0 + k, \; t_0' = t_0 + u. \quad (9)$$

The modified candidate point $(x_0,y_0,t_0)$ is substituted into equation (4), and the algorithm is iterated until the sum of the magnitudes of h, k and cu is below a selected threshold. Generally speaking, the algorithm employed by Turin et al. converges quickly. Unfortunately, this algorithm does not indicate how to find a reliable initial candidate point $(x_0,y_0,t_0)$. By computer simulation, we have found that the convergence of this algorithm is affected by the initial candidate point, the location of the transmitter, and the uncertainty in the signal arrival times (due primarily to the multipath propagation effects in urban and suburban areas). In fact, algorithm convergence may sometimes not occur due to selecting a bad initial candidate point and poor channel conditions.

SUMMARY OF THE INVENTION

It is therefore an object of the present invention to provide a transmitter location searching system which provides fast, stable and accurate results in a multipath transmission environment.

Another object is to provide an algorithm which provides not only a good initial candidate point but also a different way to solve equation (4).

Briefly, in accordance with a preferred embodiment of the invention, the area monitored by base stations is geometrically partitioned into a plurality of cells. The optima of a total cost function are then found at the center of each cell, reducing the original three-dimensional optimization problem to a one-dimensional problem. Based on this calculation, the cell providing the smallest cost is chosen as the new candidate cell. This new candidate cell is divided into four smaller cells and the minimum costs are calculated at the corners of these cells. The corner that gives the smallest cost is chosen as the center of another new candidate cell. The process is iterated until a dimension of a new candidate cell is smaller than a selected geometrical threshold by reducing each dimension of the cells by a factor of two at each iteration, the algorithm converges rapidly.

BRIEF DESCRIPTION OF THE DRAWINGS

The foregoing and other objects, aspects and advantages will be better understood from the following detailed description of a preferred embodiment of the invention with reference to the drawings, in which:

FIG. 8 is a detailed block diagram showing the time of arrival (TOA) subsystem and the ranging processor of the master station.

DETAILED DESCRIPTION OF A PREFERRED EMBODIMENT OF THE INVENTION

Figure 1:
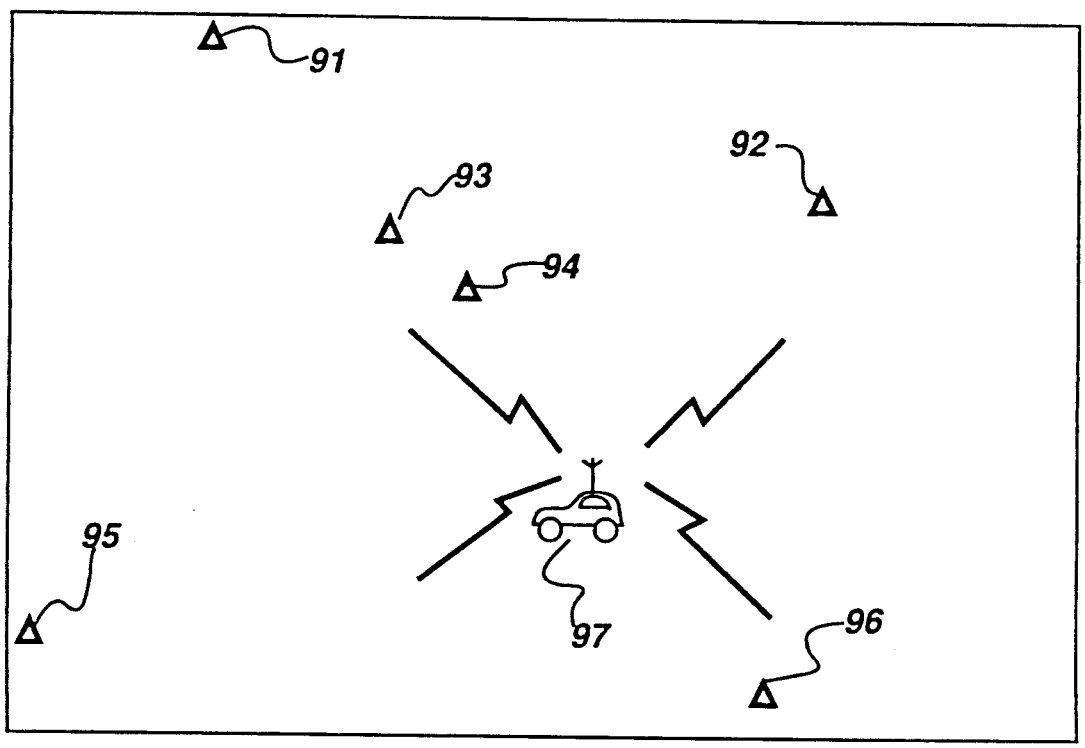
FIG. 1 is a diagrammatic illustration of a typical transmitter locating environment.

Referring to the drawings, FIG. 1 shows a typical transmitter location environment to illustrate the problem solved by the invention. The environment illustrated includes six base stations 91 to 96 (each represented by a triangle) and a mobile transmitter which may be installed on a vehicle 97. The transmitter on vehicle 97 sends a burst-type radio signal. The signal, propagated in an urban and/or suburban multipath fading environment, is received by each of the base stations 91 to 96. Using the signal arrival times that are measured at each base station with respect to a common time base, which is implemented using techniques well known in the art, a transmitter location system must estimate the location of the transmitter. Arrival time measurement methods for short duration burst radio signals are well known in the prior art.

Figure 2:
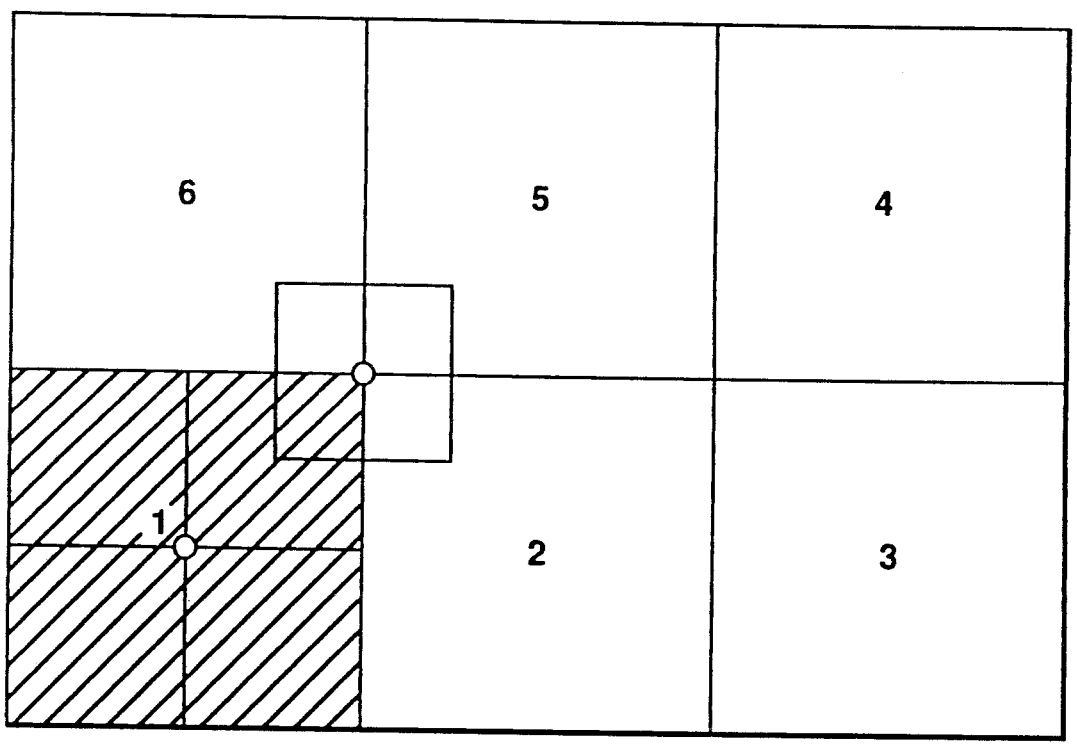
FIG. 2 is a diagram showing the geometric partition used in implementing the algorithm employed in carrying out the present invention.

The algorithm implemented to solve equation (4) according to the present invention is based on geometric partition and local optimization, as generally illustrated in FIG. 2. The whole geographical area is first divided into a number of cells N. For example, in FIG. 2 the number of cells is six. The optima of total cost function are found at the center of each cell; i.e., the original three-dimensional optimization problem is reduced to the following one-dimensional problem:

$$F_j = \underset{t}{\text{MINIMIZE}}\ F(x_j,y_j,t),\ 1 \leq j \leq N \qquad (10)$$

where $x_j$ and $y_j$ are the coordinates of the center of each cell. From the equations (1), (2) and (10), by taking the partial derivative of $F(x_j,y_j,t)$ with respect to t and setting it to be zero, the optimum time $t_{opt}$ at the center of each cell is found by the following equation:

$$t_{opt} = \frac{\sum_{i=0}^{6} w_i^2\ [ct_i - \sqrt{(x_i - x_j)^2 + (y_i - y_j)^2}\ ]}{w_i^2 c} \qquad (11)$$

where $x_i$ and $y_i$ are the coordinates of each base station, $t_i$ is the signal arrival time at the i'th base station, $w_i$ is a weighting factor (preferably related to signal strength as measured at the i'th base station), and c is the speed of light. After $t_{opt}$ is calculated for each point from equation (11) and substituted into equation (10), all the $F_j$'s are obtained. The center point that provides the smallest $F_j$ is then chosen as the center point of the region to be examined in greater detail for the vehicle location. This is termed the new candidate cell. For example, in FIG. 2, if the center point of cell 1 provides the smallest cost, then cell 1 is chosen as the new candidate cell.

After the first candidate cell is determined, it is divided into four smaller cells and the minimum costs are calculated at the corners of these cells using equations (11) and (10), with $x_j$, $y_j$ being the coordinates of each corner. The corner that provides the smallest cost is chosen as the center of another new candidate cell. The algorithm is then iterated until a dimension of a new candidate cell is smaller than a preselected threshold. If in every iteration, the dimensions of each cell are reduced by a factor of two, the algorithm terminates in approximately $$\log_2 \left[ \frac{\text{searching/area/dimensions}}{\text{final/resolution}} \right]$$

steps. Optimum total cost for each corner of the smaller cells is again found by solving the following equation:

$$F(x_j, y_j, t_{opt}) = \sum_{i=1}^{6} w_i^2 [c(t_i - t_{opt}) - \sqrt{(x_i - x_j^2) + (y_i - y_j^2)}\,]^2. \quad (12)$$

Figure 3:
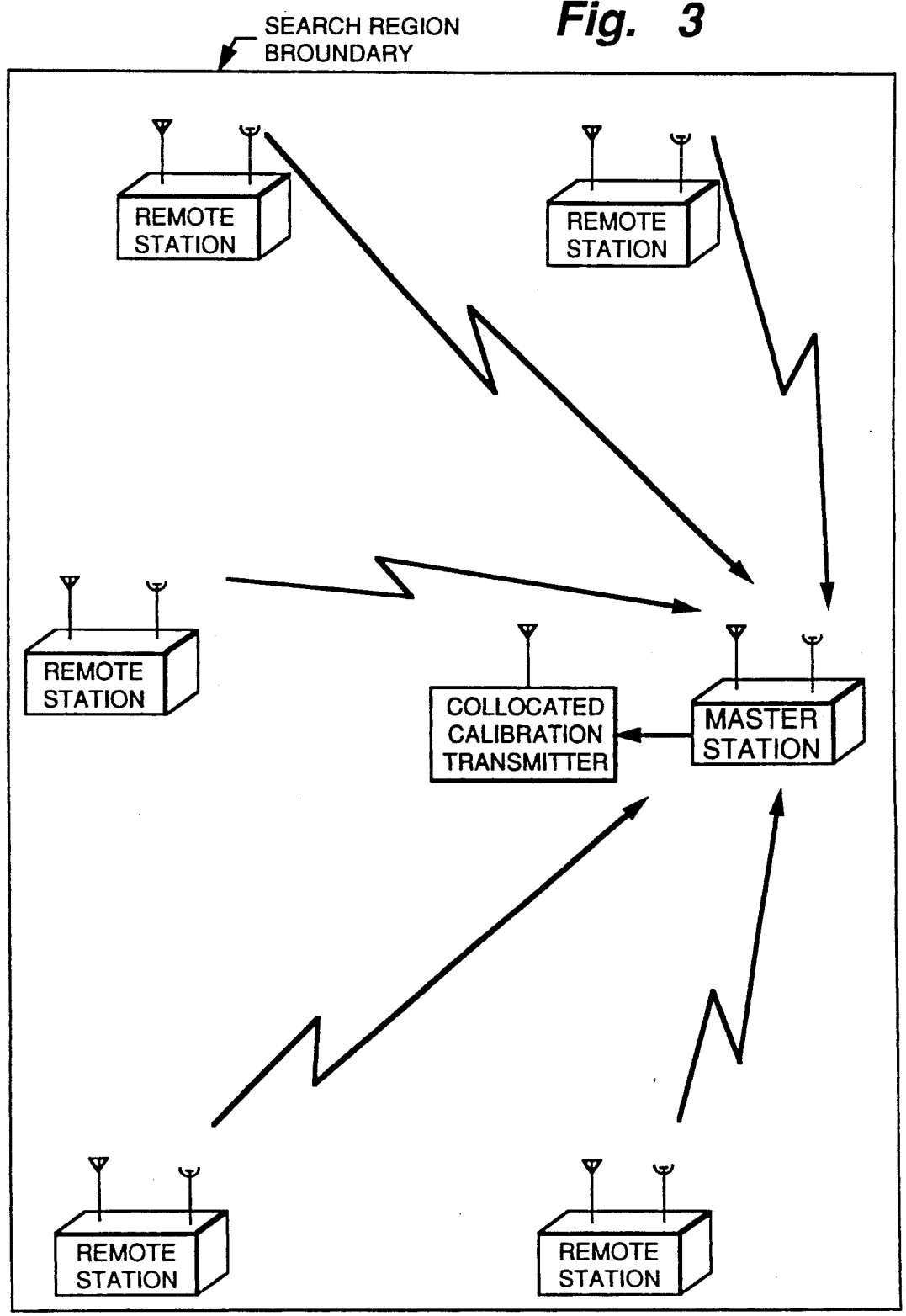
FIG. 3 is a diagrammatic illustration of an exemplary system configuration according to the present invention.

A system utilizing this location technique is comprised of a plurality of receiving sites (i.e., base stations) interconnected with the master or central location site. The means for such interconnection are well known to those skilled in the art and may comprise microwave links, cables or telephone lines. FIG. 3 diagrammatically illustrates the system concept. Each of the base station receivers is selected to be of the appropriate type to receive and demodulate the burst type radio frequency (RF) transmission from the remote unit (i.e., motor vehicle) to be located. This burst contains information identifying the transmitting unit as well as information selected to enhance the ranging performance of the system. The information is preferably coded in digital format with modulation selected to optimize overall performance objectives; e.g., use of nonlinear transmitting power amplifiers, and the like. A calibration transmitter is preferably collocated with the central or master station for the purpose of transmitting a test ranging burst to the multiple system receivers situated at the respective base station locations. The calibration burst is used to measure the delays inherent in the individual receivers and the interconnection network that couples the receivers to the central station so that these delays may be removed from the location determination process.

There are several ways to partition the system required to implement the ranging algorithm disclosed herein. One method, which may be termed a "centralized" method, is to put all of the delay measurement and processing at the master (or central) station while a second approach is to distribute the arrival time measurements to the individual base stations and implement the computational requirements at the master station. The centralized method involves comparing the arrival time of the individual base station signals to a local reference. By aligning or calibrating each base station local reference with a system reference using techniques well known to those skilled in the art, the relative base station arrival times of the signal from a given mobile source may be directly measured and sent to the master location site. The second technique requires that the received signal be sent to the master site and that the arrival times be measured with respect to each other. This implies that a noisy reference will be used and will reduce the accuracy that can be achieved. Nevertheless, system issues may require this latter approach in some applications.

Figure 4:
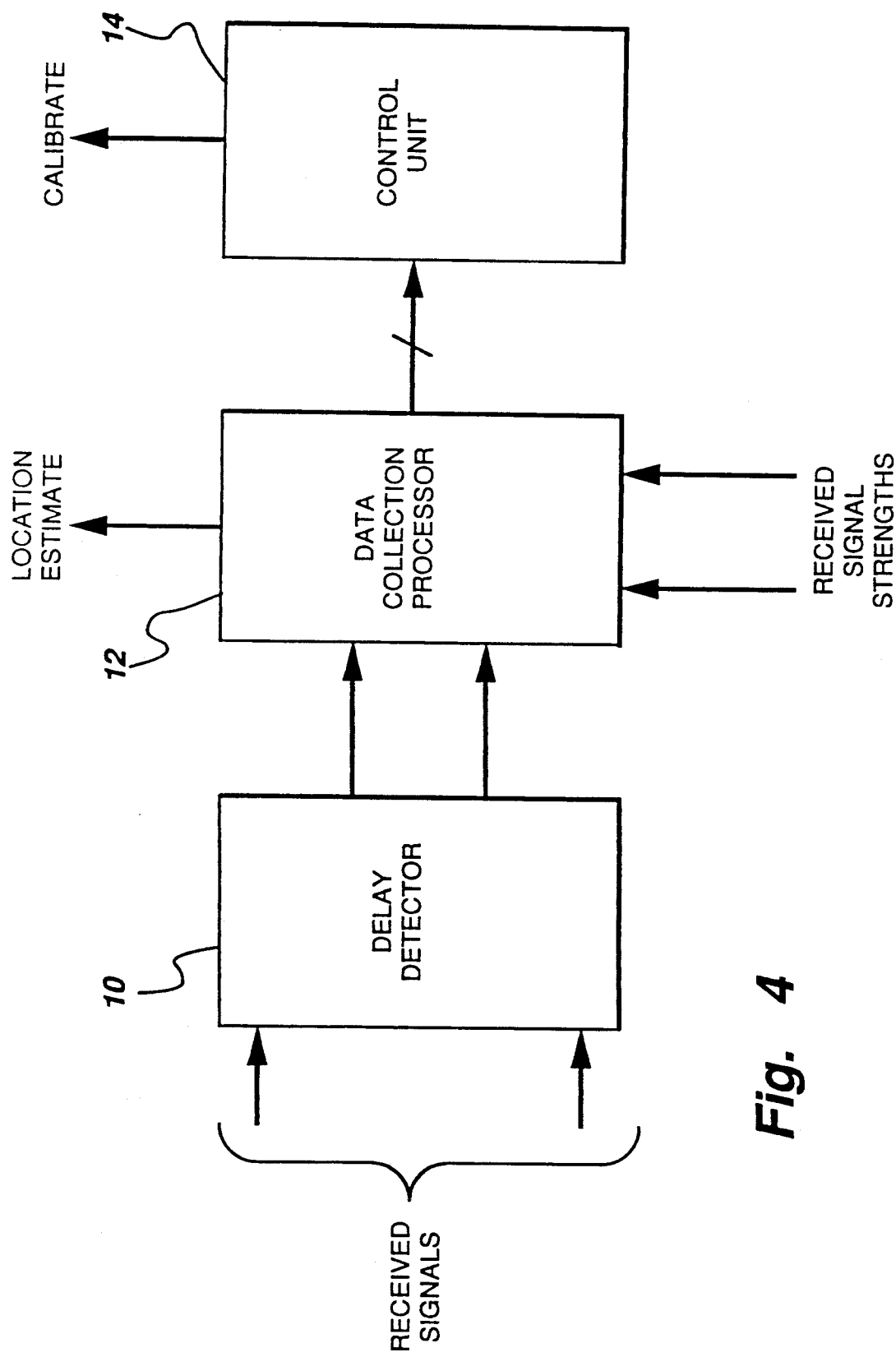
FIG. 4 is a block diagram of a transmitter location searching system which implements an algorithm, described herein, in carrying out the present invention.

FIG. 4 is a block diagram of the hardware employed for the centralized method, where the delay measurement and processing functions are located at the master station. The main components are a delay detector 10, which measures the relative delays of the signals received from the respective base stations, a data collection processor 12 and a control unit 14. The data collection processor implements the location measurement algorithm, and the control unit provides the necessary steps to measure the hardware delays and optimize system performance by removing equipment delay bias. As shown in FIG. 4, the centralized method requires that the ranging signals be "echoed" in an unmodulated form to the master station by the respective base station over the interconnection paths provided. Additionally, measures of the signal strength taken at the respective base station are supplied to the master station.

Figure 5:
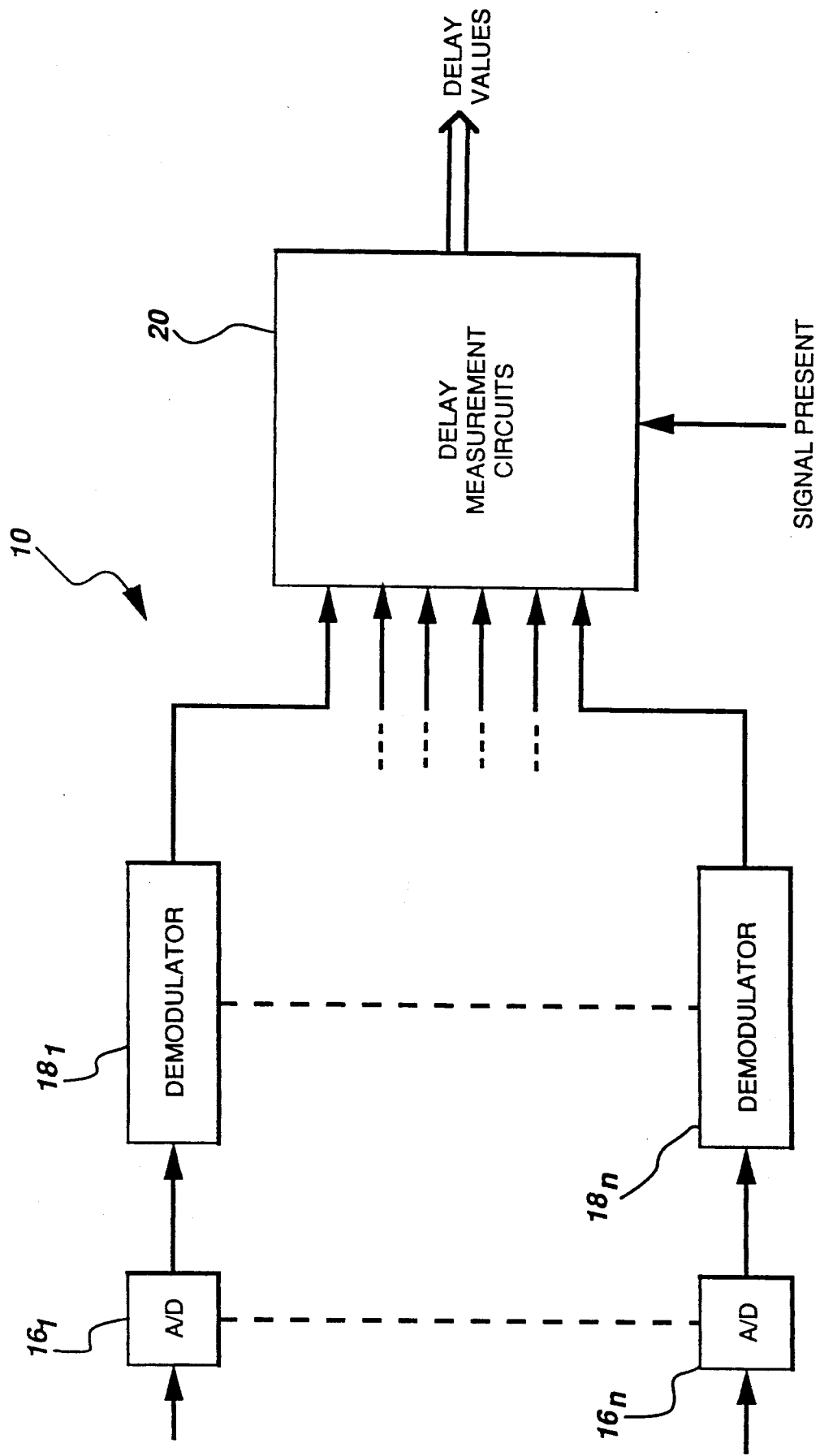
FIG. 5 is a block diagram of the delay detector system employed in the transmitter location searching system of FIG. 4.
Figure 6:
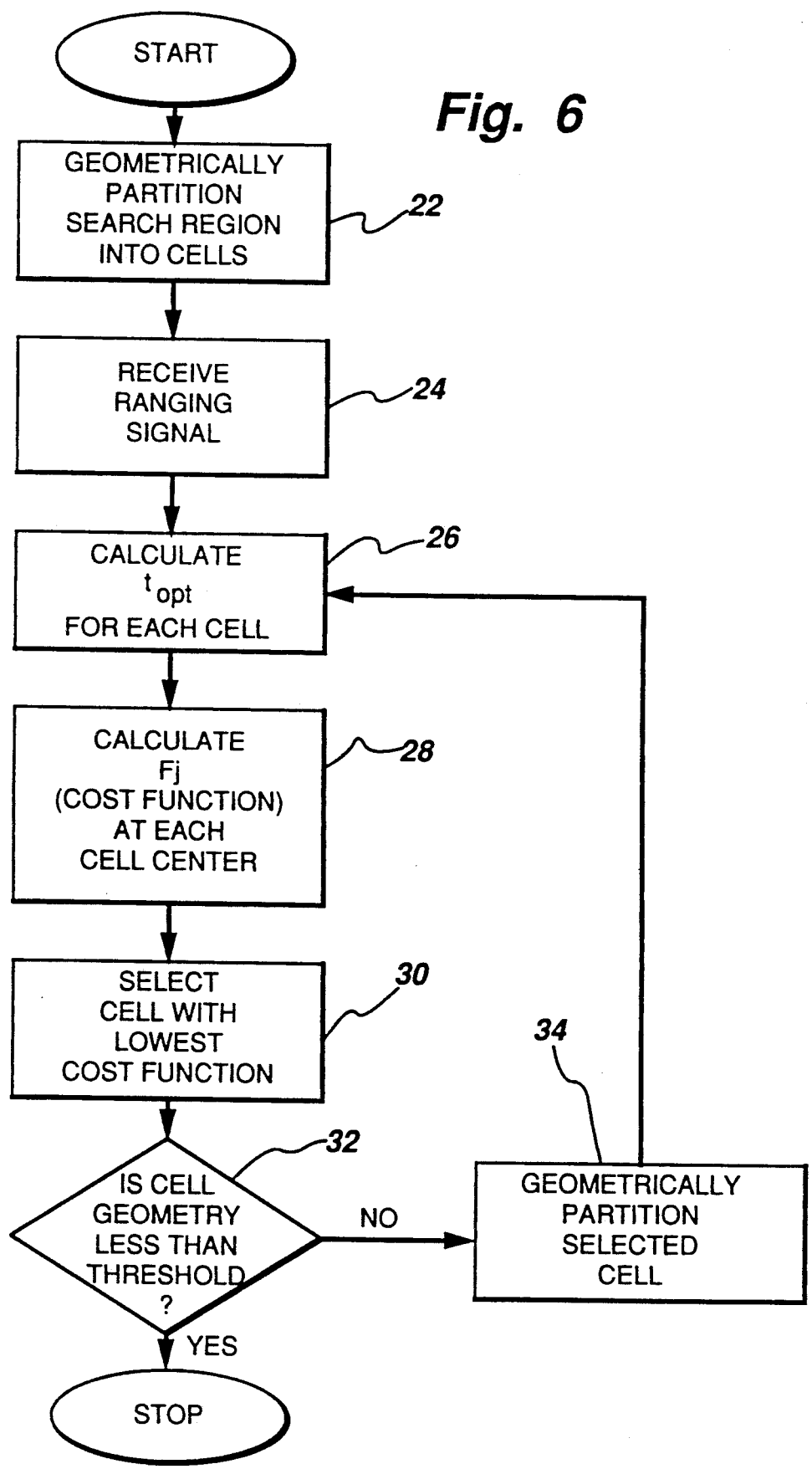
FIG. 6 is a flow diagram showing the processing logic for the algorithm employed in carrying out the present invention.

FIG. 5 is a block diagram of delay detector 10 of FIG. 4. The input analog signals are converted to digital signals by a bank of analog-to-digital (A/D) converters $16_1$ to $16_n$ for the number n of base stations. A bank of demodulators $18_1$ to $18_n$ is used to detect the digital signals. The detected bit streams are then supplied to delay measurement circuits 20. Noncoherent demodulators are preferably employed to allow rapid signal acquisition over a fading channel. The demodulators used may be of the integratable, zero IF type described and claimed in U.S. Pat. No. 4,755,761, "Zero Intermediate-Frequency Demodulator", issued Jul. 5, 1988, to Robert T. Ray, Jr., and assigned to the instant assignee, and enhanced as described in U.S. Pat. No. 4,902,979, "Homodyne Down-Converter with Digital Hilbert Transform Filtering", issued Feb. 20, 1990, to Charles M. Puckette and assigned to the instant assignee, and in U.S. Pat. No. 4,888,557 issued Dec. 19, 1989, to Charles M. Puckette and Gary J. Saulnier, for "Digital Subharmonic Sampling Down-Converter" and assigned to the instant assignee, to control the delay measurement circuits. The disclosures of the aforementioned U.S. Pat. Nos. 4,755,761, 4,888,557 and 4,902,979 are incorporated herein by reference. The flow diagram for the improved algorithm employed in the invention is shown in FIG. 6. The process begins at step 22 by geometrically partitioning the search region into cells using a knowledge of the base station locations. These data are stored for use in subsequent calculations. The ranging signal is received by the base stations at step 24 and, at step 26, $t_{opt}$ is calculated using equation (11). The cost function $F_j$, for each cell center, is then calculated at step 28 using equation (12). At step 30, the cell with the lowest cost function is selected. A test is made at step 32 to determine if the cell size is less than the threshold. If not, the selected cell is geometrically partitioned at step 34, and the process loops back to step 26 to recalculate $t_{opt}$. When the cell size is less than the threshold as determined by the test at step 32, the process stops.

Figure 7:
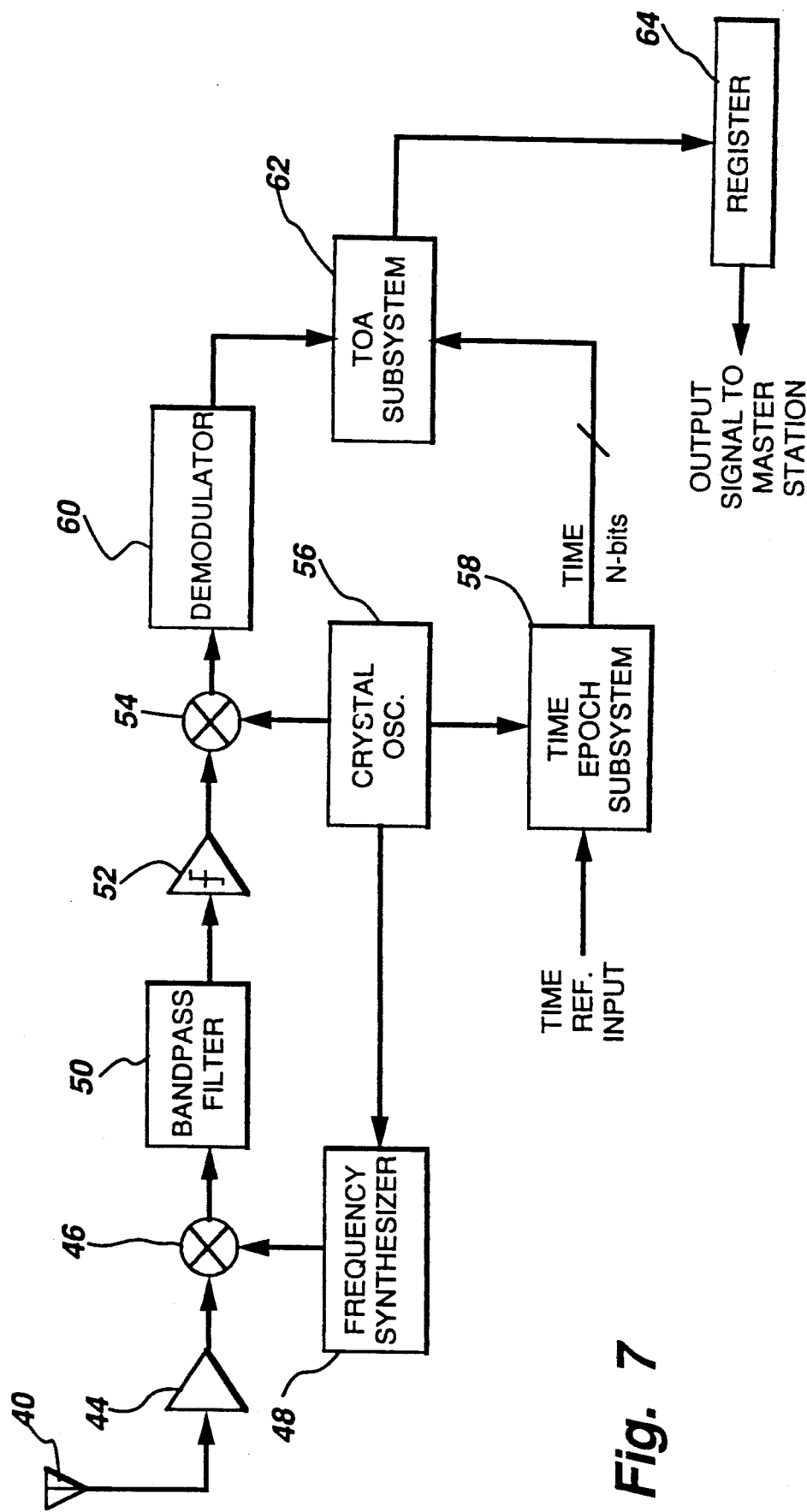
FIG. 7 is a block diagram of the base station receiver which implements the algorithm, used in carrying out the present invention, with the delay measurement performed at the individual remote receiver sites.

FIG. 7 is a block diagram of the base station receiver which implements the improved algorithm according to the invention, with signal arrival time measured at respective base stations. A burst radio signal from a mobile transmitter is received at an antenna 40 and passed to a radio frequency (RF) amplifier 44 which amplifies the signal and applies it as an input signal to a first mixer 46. Mixer 46 also receives a synthesized frequency signal from a frequency synthesizer 48 to produce a first intermediate frequency (IF) signal. This first IF signal is passed by a bandpass filter 50 to a limiter 52. The output signal of the limiter is provided to a second mixer 54 which also receives a local oscillator frequency signal from a crystal oscillator 56. The crystal oscillator also provides input signals to frequency synthesizer 48 and to a time epoch subsystem 58. The output signal of second mixer 54 is supplied to a demodulator 60 which provides a baseband frequency signal to a time of arrival (TOA) subsystem 62. The TOA subsystem also receives an N-bit digitally-encoded time signal in word serial form from the time epoch subsystem 58.

The time epoch subsystem is essentially a stable digital clock that is initialized by a time reference input signal and incremented by a stable frequency source such as crystal oscillator 56. The time reference input signal may preferably be obtained from the calibration burst sent from the calibration transmitter, shown in FIG. 3, which is controlled by control unit 14, shown in FIG. 4. Alternatively, suitable broadcast signals such as WWV, Loran, and the like, may be used to provide the time reference input, albeit at the expense of additional receiving equipment. The time reference input signal to the time epoch system initializes the state of the digital clock comprising the time epoch subsystem to a value that is thereafter incremented by the constant frequency timing signal generated by crystal oscillator 56.

The relative delay of the signal received at each base station is preferably measured by comparing the times at which the edges of the received and the digitally-encoded time data signals occur. By performing this measurement over the duration of the burst-type ranging signal, multiple independent measurements may be made and averaged to improve accuracy. The output signal of TOA subsystem 62 is a K-bit digital signal which is formatted in register 64 and applied to communication link 66 which interconnects the base station and the master station. As mentioned, the communication link can be any suitable medium including microwave, cable, telephone line, etc. The K-bit digital signal transmitted by each base station to the master station consists of N-bits of time data and M-bits of base station address data plus any required synchronizing, error detecting and correcting codes, or other bits.

FIG. 8 is a block diagram showing in more detail TOA subsystem 62 and a ranging processor 74 at the master station. It will be understood that each base station transmits a K-bit digital signal to the master station as a result of receiving and processing a burst radio signal from the mobile transmitter. The master station may also serve as a base station. The TOA subsystem includes a correlator 68 which receives the output signal from demodulator 60 and a local clock signal, which may be derived from crystal oscillator 56. Correlator 68 preferably comprises a delay line filter whose weights are selected in accordance with the transmitted burst waveform. The output signal of correlator 68 is supplied to a threshold circuit 70 wherein it is compared in amplitude against a correlation threshold. The output signal of threshold circuit 70 serves as a storage strobe signal for a time latch 72 which stores the N-bit time signal from time epoch subsystem 58. K-bits of this stored signal are either read out to ranging processor 74 (when the base station is actually serving as a base station) or transmitted to the master station for processing by the ranging processor.

Ranging processor 74 receives time of arrival signals $TOA_{1-i}$ from all the base stations. These are supplied to a coverage recognition data base 76, which, in response to the addresses stored in an address register 78, reads out the variables $x_j, y_j, t_i$ to arithmetic unit 80. Arithmetic unit 80 also receives the locations of each base station $x_i, y_i$ from a base station geographic data base 82. Arithmetic unit 80 performs the calculations of equation (11) and $F(x_j, y_j, t_{opt})$ according to equations (1) and (2), as indicated in function blocks 26 and 28 in the flow diagram of FIG. 6. The iterations are performed by indexing address register 78 from arithmetic unit 80 until the cell geometry is less than the threshold. At this point, the output signal of arithmetic unit 80 corresponds to, and thus identifies, the location of the mobile transmitter.

The initial partition of the geographical area into a number of cells and finding a new candidate cell not only narrows the searching area down to a smaller region, but it also provides a good initial candidate point for the Turin et al. algorithm. The initial candidate point is only the center of the first new candidate cell. The accuracy of the initial candidate point can be increased by increasing the number of initial cells. Therefore, the convergence of the Turin et al. algorithm can be guaranteed by using the algorithm implemented by the present invention as a preprocessor.

Table 1 shows the simulated performances of the algorithm implemented by the present invention in combination with the Turin et al. algorithm, both with and without preprocessing as functions of multipath delay spread. The performances are measured in terms of mean and standard deviation of prediction error.

TABLE 1

| Delay Spread (μsec) | Simulated prediction Errors | | | | | |
|---|---|---|---|---|---|---|
| | Invention Algorithm | | Turin et al. Pre-processed | | Algorithm Unpre-processed | |
| | mean | std. | mean | std. | mean | std. |
| 0 | .02 | .09 | .00 | .00 | .00 | .00 |
| 1 | .08 | .11 | .08 | .07 | .09 | .32 |
| 2 | .16 | .16 | .15 | .14 | .16 | .25 |
| 3 | .23 | .22 | .23 | .22 | .26 | .45 |
| 4 | .30 | .27 | .31 | .29 | .34 | .53 |
| 5 | .37 | .32 | .38 | .35 | .42 | .58 |

In the simulation, the searching area was assumed to be a rectangular area 20 miles wide and 15 miles long, analogous to the environment shown in FIG. 1. The base stations locations were assumed to be arranged generally as indicated by FIG. 1. The weighting factor $w_i$ for each base station was assumed to be 1. The mobile transmitter was assumed to be deployed at 300 points which construct a uniform grid in the searching area. At every transmitter location (i.e., grid point), ten simulation runs were made using different multipath delays generated from random number generators for each delay period.

Multipath delay from each base station was assumed to be uniformly distributed. The whole area was divided into six cells in the initial partition in the algorithm implemented by the invention and the preprocessed algorithm of Turin et al. In the unpreprocessed algorithm of Turin et al., the initial candidate point is set to the coordinates (with a small offset added to avoid a division by zero) and the signal arrival time of the base station which first receives the transmitted signal from the mobile radio station.

It will be observed from Table 1 that as multipath delay spread increases, both the algorithm implemented by the invention and the Turin et al. algorithm with preprocessing achieve better performance than the unpreprocessed algorithm of Turin et al. This performance improvement can be observed from both mean and standard deviation of final accuracy. The high standard deviation of the Turin et al. unpreprocessed algorithm indicates that its performance is poor at some geographical points under certain multipath channel conditions. These "blind points" are unpredictable and undesirable in some critical applications.

While both the algorithm implemented by the present invention and the Turin et al. algorithm with preprocessing are more accurate and stable than the unpreprocessed algorithm of Turin et al., more calculations are required to achieve high precision when the number of initial partitions is large. This limitation on speed can be overcome by replacing those fixed distance calculations in equation (1) by lookup tables in a practical embodiment implemented for a specific environment.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A transmitter location searching method useable in a multipath transmission environment, comprising the steps of:
   (a) geometrically partitioning a monitored area into a plurality of cells;
   (b) receiving at the base stations a burst transmission from a transmitter to be located;
   (c) determining minima of a total cost function at the center of each cell in response to receipt of said burst transmission;
   (d) choosing the cell with the smallest of the plurality of total cost functions as a new candidate cell for locating said transmitter;
   (e) dividing the new candidate cell into smaller cells;
   (f) determining minimum costs for each corner of the smaller cells; and
   (g) iterating the process of steps (c)–(f) until a dimension of a new candidate cell is smaller than a selected geometric threshold.

2. The method according to claim 1 wherein the dimensions of the cells are reduced by a factor of two at each iteration.

3. The method according to claim 1 wherein the step of determining minima ($t_{opt}$) of a total cost function comprises solving the following equation:

$$t_{opt} = \frac{\sum_{i=0}^{6} w_i^2 [ct_i - \sqrt{(x_i - x_j)^2 + (y_i - y_j)^2}\,]}{w_i^2 c}$$

where $x_j$ and $y_j$, are either coordinates of the center of each initial cell or coordinates of each corner of divided smaller cells, $x_1$ and $y_i$ are the coordinates of the i'th base station, $w_i$ is a weighting factor, $t_i$ is the measured signal arrival time at the i'th base station from said transmitter, and c is the speed of light.

4. The method according to claim 3 wherein the step of determining minimum total cost $F(x_j, y_j, t_{opt})$ for the center of each of the initially-created cells and each corner of each of the divided smaller cells is performed by inserting the calculated $t_{opt}$ into the following equation:

$$F(x_j, y_j, t_{opt}) = \sum_{i=1}^{6} w_i^2 [c(t_i - t_{opt}) - \sqrt{(x_i - x_j^2) + (y_i - y_j^2)}\,]^2.$$

5. The method according to claim 1 wherein each of said base stations performs the step of determining a time of arrival of said burst transmission and further performs the step of transmitting said time of arrival to a master station to enable said master station to perform the iterated steps of geometrically partitioning a monitored area into a plurality of cells.

6. The method according to claim 5 wherein said master station also functions as a base station and performs the step of determining a time of arrival of said burst transmission.

7. A transmitter location searching system comprising:
   a plurality of base stations distributed over an area to be monitored, each of said base stations being adapted to receive a burst RF transmission from a transmitter within said area, the burst transmission containing information identifying the transmitter, each of said base stations further including a time of arrival subsystem responsive to a time reference and to said information for generating an output signal identifying said transmitter and a time arrival of a burst RF transmission from said transmitter; and
   a master station for receiving output signals from each of said base stations, said master station including ranging processor means for geometrically partitioning the monitored area into a plurality of cells based on the locations of said plurality of base stations, determining the minima of a total cost function at the centers of the cells, choosing the cell with the smallest of the plurality of total cost functions as a new candidate cell, dividing the new candidate cell into smaller cells, determining minimum costs for each corner of the smaller cells, and iterating the portion of the process beginning with determining the minima of a total cost function at the centers of the cells, until a dimension of a new candidate cell is smaller than a selected geometric threshold.

8. The transmitter location searching system recited in claim 7, and further including a time epoch subsystem at each of said base stations for generating a system synchronized time signal, said time of arrival subsystem comprising:
   a correlator connected to receive a clock signal and a signal produced by demodulating said burst RF transmission so as to produce a correlated output signal;
   a threshold circuit for comparing said correlated output signal with a reference signal and producing a strobe signal if said correlated output signal exceeds said reference signal; and
   a time latch responsive to said strobe signal for storing said synchronized time signal.

9. The transmitter location searching system recited in claim 8 wherein said correlator comprises a tapped delay line filter having tap weights selected in accordance with the burst RF transmission waveform.

10. The transmitter location searching system recited in claim 8 wherein said ranging processor comprises:
    a coverage recognition data base for receiving and storing output signals from each of said base stations;
    a base station geographic data base for storing locations of said base stations; and
    an arithmetic unit coupled to said data bases for processing said stored output signals to determine said transmitter location.

11. The transmitter location searching system recited in claim 7 wherein said master station also comprises a base station.

12. The transmitter location searching system recited in claim 7 further comprising a calibration transmitter for transmitting a calibration time signal to said base stations to synchronize the time epoch subsystems of said base stations.

13. The transmitter location searching system recited in claim 12 wherein said calibration transmitter is collocated with said master station.

* * * * *